Aug. 7, 1962 J. F. WAHL 3,048,721

HOUSING FOR APPLIANCES

Filed May 23, 1958

INVENTOR.
John F. Wahl
BY
Zabel, Baker, York, Jones and Dithmar
Attorneys

United States Patent Office 3,048,721
Patented Aug. 7, 1962

3,048,721

HOUSING FOR APPLIANCES

John F. Wahl, Sterling, Ill., assignor to Wahl Clipper Corporation, Sterling, Ill., a corporation of Illinois Filed May 23, 1958, Ser. No. 737,383
3 Claims. (Cl. 310—29)

This invention relates to a housing for appliances, and more particularly to a molded housing having means integrally formed therewith for holding the appliance mechanism in predetermined position inside the housing.

The business of manufacturing appliances or instruments is very competitive, and in general economies in manufacture are almost as important as improvements in performance. Since the cost of labor is high, useful economies in manufacture can best be obtained through a simplification of the assembly procedure.

Heretofore, mechanisms for the appliances or instruments were mounted inside the appliance or instrument housing by means of elongated screws or screw like elements, which extended through openings in a portion of the mechanism and which were in threaded engagement with threaded openings formed in the housing. The difficulty with this arrangement was that the openings in the mechanism had to be aligned with the threaded holes in the housing before the screws could be threaded into them to hold the mechanism in place. This alignment was difficult to achieve because the position of the threaded holes in the housing was frequently obscured by the mechanism being mounted. Consequently these openings had to be aligned with the threaded holes in the housing by trial and error. This increased the time required for assembling the appliance, and this added time becomes very costly in large scale production.

In addition, when the mounting holes in the housing were formed in bosses, metallic screw receiving threaded inserts often had to be inserted in these holes to prevent the bosses from cracking. The time required to mount these inserts in the mounting holes as well as their cost, further increased the cost of manufacture of the appliance. It is apparent that the tendency of the bosses to crack could be reduced by increasing their width, but this would be objectionable when the mechanism is a vibratory motor because it would require larger openings in the core of the motor and this would materially reduce the cross section of its magnetic circuit.

Furthermore, when the appliance was a vibrating unit, such as an electric shaver, the screws holding the motor inside the housing tended to loosen due to the vibrations of the motor, unless special precautions were taken, which further increased the cost of manufacturing the device.

What is needed therefore and comprises the principal object of this invention is a housing for appliances having means integrally secured thereto for aligning and holding an appliance mechanism in predetermined position inside the housing.

Still another object of this invention is to provide a housing for appliances having integral and elongated bosses attached thereto which are adapted to extend through an appliance mechanism for aligning and holding it in predetermined position.

Yet another object of this invention is to provide a molded housing for appliances having integral and elongated bosses formed therewith which are adapted to extend through an appliance mechanism for aligning and holding it in a predetermined position inside the housing, and which additionally provide means for attaching additional objects to the appliance mechanism.

Yet a further object of this invention is to provide an electric shaver which can be assembled quickly and economically.

These and other objects of this invention will become more apparent when read in the light of the accompanying drawings and specification wherein.

Figure 1:
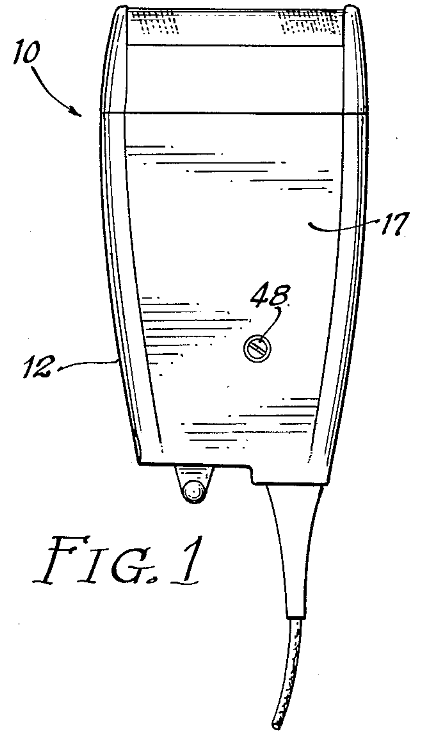
FIG. 1 is a plan view of an electric shaver embodying the features of this invention.
Figure 2:
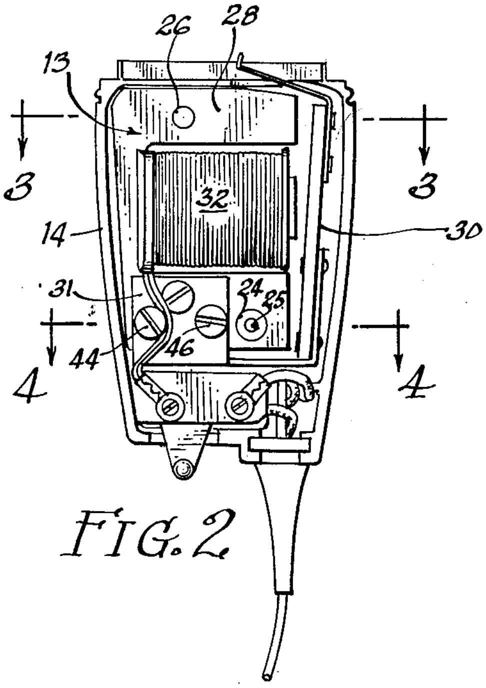
FIG. 2 is a plan view of the electric shaver shown in FIG. 1 but with the upper molded housing section removed to disclose the arrangement of the motor inside the housing.
Figure 3:
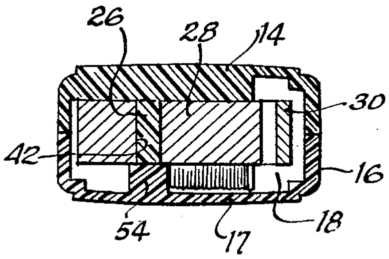
FIG. 3 is a sectional view taken on the line 3—3 of FIG. 2 and looking in the direction indicated.

Referring now to FIG. 1 of the drawing, an electric shaver embodying the principles of this invention and indicated generally by the reference numeral 10 comprises a molded housing indicated by the reference numeral 12, and an electromagnetic motor indicated by the reference numeral 13, see FIG. 2. The housing, in this particular embodiment, is formed from molded nylon and is in two sections 14 and 16. These sections, as seen in FIGS. 3 and 4, are connected together to provide an inner space 18 therebetween for accommodating the motor 13, but it is apparent that the principles of this invention can apply to a housing enclosing any kind of article.

Four bosses, projecting into the inner space 18, are integrally formed with section 14. As seen in FIGS. 2, 3 and 4, three of these bosses, 20, 22 and 24, are disposed in spaced relation to each other along a straight line at one end of section 14, and boss 26 is disposed at the other end thereof. Each boss is circular in cross section, though this is not an essential limitation, and they are long in comparison to their width, for reasons to become apparent below.

The electromagnetic vibratory motor in this particular embodiment comprises a core 28, an armature assembly 30, and a coil 32. As seen in FIG. 2, the coil 32 is mounted on center pole 34 of the core. The core 28 is provided with four boss receiving openings 36, 38, 40 and 42, see FIGS. 3 and 4. These openings extend through the core and are spaced to receive the bosses 20, 22, 24 and 26 when the core 28 is mounted in the housing. This arrangement holds the core of the motor 13 in predetermined position.

Figure 4:
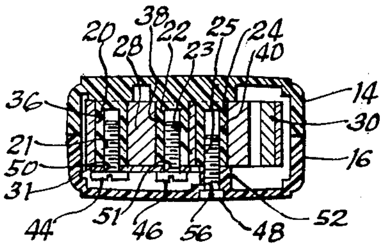
FIG. 4 is a sectional view taken on the line 4—4 of FIG. 2 and looking in the direction indicated.

As seen in FIG. 4, the free ends of bosses 20, 22 and 24 are provided with axially extending bores 21, 23 and 25 for receiving self-tapping screws 44, 46 and 48, for reasons to be described below.

The armature assembly 30 has a mounting portion 31, see FIG. 2 which is provided with openings 50 and 51 see FIG. 4 which are spaced so they can be aligned with the bores 21, 23 in bosses 20 and 22. With this arrangement, the armature assembly can be conveniently mounted in the housing and connected to core 28 by connecting or mounting screws 44 and 46, see FIG. 4. It is noted however, that the boss 26 at the opposite end of section 14 is not provided with a bore at its free end because it has not been found necessary to positively secure molded sections 14 and 16 together at that point. The boss 26, however, does serve a useful function because it supports that end of the housing, as will become apparent below.

Section 16 is provided with an integral boss 52 at one end and a boss 54 at the other end. As seen in FIGS. 3 and 4, these bosses project inwardly into space 18 with boss 54 abutting against end of boss 26, and boss 52 abutting against the end of boss 24, whereby these bosses form internal supporting pillars for supporting the opposite sides of the housing. Boss 52 is provided with a screw receiving axially extending opening 56 extending therethrough which communicates with the outer surface 17 of section 16, see FIG. 1. This opening 56 is coaxially aligned with and communicates with the bore 25 in boss 24 so that when the sections 14 and 16 are assembled together the connecting screw 48 can be threaded into these openings to hold the housing sections 14 and 16 in assembled relation.

In addition, the housing sections and the integrally molded bosses in this invention are formed from nylon. This is important because nylon is an insulating material, so that when the appliance is handled, the risk of dangerous electric shocks is substantially decreased. In addition because the molded nylon is somewhat resilient when the screws are threaded into the bores in the bosses, they tend to enlarge the openings and expand the bosses without cracking them. This causes the bosses to tightly grip the screws and prevents them from becoming loosened by vibrations during use and the expanded bosses tend to wedge tightly in the core apertures. This is particularly important when a vibrating motor is to be mounted inside the housing.

Finally, it can be seen that the assembly of the electric shaver, or any other appliance constructed according to the principles of this invention is very simple and rapid. The molded housing sections 16 and 14 are preferably integrally formed with the bosses, and the core 28 of the motor is provided with pre-spaced bore receiving openings. It is only necessary to align the openings in the core 28 with these bosses (a simple matter when the bosses project upwardly as high as they do), and then drop the core into the housing section 14 with the bosses passing through these openings. This effectively holds the core 28 in a predetermined position inside the housing.

Next, the mounting portion 31 of the armature assembly is positioned on the core 28, so the openings 50 and 51, in the mounting portion are aligned with the bores 21, and 23 in the bosses 20 and 22. This is also a very simple matter because the ends of these bosses are substantially flush with the upper surface of the core, which as seen in FIG. 4 is readily accessible. Finally the screws 44 and 46 are threaded into the bores 21 and 23 through the mounting portion 31 to hold the armature assembly on the core, and the upper section 16 is positioned on the lower section with the screw 48 passing through the openings 56 in boss 52 and the bore 25 in boss 24 to tightly hold the housing sections together.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

I claim:

1. An electric shaver of the class described comprising in combination a housing composed of a first molded section and a second molded section, said molded sections formed from nylon and adapted to be connected together to provide an inner space, at least four nylon bosses projecting into said inner space in spaced relation to each other and integrally molded with said first section, three of said bosses disposed adjacent one end of said first section and a fourth boss disposed adjacent the other end, each boss circular in cross section and long in comparison to its diameter, and an electric shaver motor, said motor including a core and an armature assembly, said core having a plurality of boss receiving openings extending therethrough, said boss receiving openings in said core spaced to receive said four bosses formed with said first section, said core mounted in said inner space of said housing with said bosses extending through said boss receiving openings to hold said core in a predetermined position in said housing, the ends of at least the three bosses adjacent one end of said first section provided with an axial bore extending from their free ends, said axial bores adapted to receive screws, said armature assembly having screw receiving openings formed therein which are spaced to be aligned with said bores in at least some of said bosses in said first section, screws extending through said crew receiving openings in said armature assembly and in threaded engagement with the bores in said bosses to simultaneously and removably secure said armature assembly to said core and said core in substantially fixed position in said housing, at least one boss formed with said second section and projecting into said inner space with its free end abutting the free end of one of said three bosses adjacent one end of said first section, a screw receiving axially extending opening extending through said one boss in said second section and communicating with the outer surface thereof, said opening substantially coaxial with said bore in the free end of one of said three bosses whereby the housing sections can be connected together and the core locked to the housing by a screw extending through said abutting bosses in both sections, the openings extending through the core sized to permit a close fit with the bosses whereby screws inserted in the bores of said bosses cause them to expand into gripping engagement with the core, and the restraint on the expansion of the bosses imposed by engagement of the bosses with the inner surfaces of the openings in the core cause the bosses to grip the screws to prevent same from loosening due to motor vibration.

2. An apparatus of the class described comprising in combination a housing, said housing formed from a resilient material having a resiliency approximately equal to that of nylon and composed of at least one molded section, said molded section defining an inner space for receiving an article, a plurality of resilient bosses integral with said section projecting into said inner space in spaced relation to each other, and an article in said housing, said article having boss receiving openings extending therethrough and mounted in said housing with said bosses extending through said boss receiving openings to hold the article in predetermined position, the bosses in said inner space provided with axially extending bores for receiving screws, an object, said object having screw receiving openings therein aligned with the bores in said bosses, the openings extending through the article sized to permit a close fit with the bosses whereby screws inserted through the screw receiving openings in said object into threaded engagement with said bores in said bosses causes the bosses to expand into gripping engagement with the article and the restraint on the expansion of the bosses imposed by their engagement with the inner surfaces of the openings in the article causes the bosses to grip the screws whereby said object is removably locked to said article while said article is simultaneously locked in said housing.

3. A vibratory unit of the class described comprising in combination a housing composed of a first molded section and a second section, said molded section formed from a resilient material having a resiliency approximately equal to that of nylon and adapted to be connected with said second section to provide an inner space for receiving the core of the vibratory unit, at least one resilient boss integral with said first molded section projecting into said inner space, and a core, said core having at least one boss receiving opening extending therethrough sized to provide a close fit with said boss and mounted in said housing with said boss extending through said boss receiving opening, said boss provided with an axial bore adapted to receive a screw, said second section provided with a screw receiving opening adapted to be aligned with the bore in said boss whereby a screw inserted through said second section into threaded engagement with said bore in said boss holds said sections together and causes the boss to expand into gripping engagement with the core while the restraint on the expansion of the boss imposed by its engagement with the inner surface of the opening in the core causes the boss to grip the screw and prevents it from loosening because of motor vibration.

References Cited in the file of this patent

UNITED STATES PATENTS

| | | |
|---|---|---|
| 1,695,516 | Van Osdel | Dec. 18, 1928 |
| 2,088,955 | Hamill | Aug. 3, 1937 |
| 2,438,958 | Abrahmson | Apr. 6, 1948 |
| 2,740,197 | Padua | Apr. 3, 1956 |